United States Patent
Ikeda et al.

(10) Patent No.: US 9,601,781 B2
(45) Date of Patent: Mar. 21, 2017

(54) SECONDARY BATTERY AND METHOD FOR MANUFACTURING SECONDARY BATTERY

(71) Applicants: Takenori Ikeda, Toyota (JP); Kiyomi Kozuki, Moriguchi (JP)

(72) Inventors: Takenori Ikeda, Toyota (JP); Kiyomi Kozuki, Moriguchi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 165 days.

(21) Appl. No.: 14/399,112

(22) PCT Filed: Jul. 9, 2013

(86) PCT No.: PCT/JP2013/068764
§ 371 (c)(1),
(2) Date: Nov. 5, 2014

(87) PCT Pub. No.: WO2014/021065
PCT Pub. Date: Feb. 6, 2014

(65) Prior Publication Data
US 2015/0118568 A1    Apr. 30, 2015

(30) Foreign Application Priority Data
Jul. 30, 2012  (JP) .................... 2012-168643

(51) Int. Cl.
*H01M 4/70*  (2006.01)
*H01M 2/26*  (2006.01)
(Continued)

(52) U.S. Cl.
CPC ........... *H01M 4/70* (2013.01); *B23K 11/0026* (2013.01); *B23K 11/115* (2013.01); *H01M 2/263* (2013.01);
(Continued)

(58) Field of Classification Search
CPC .................... B23K 11/0026; B23K 11/115
See application file for complete search history.

(56) References Cited

U.S. PATENT DOCUMENTS

2006/0240323 A1  10/2006  Tomihara et al.
2008/0081499 A1*  4/2008  Sumi .................... H01R 4/023
                                    439/207
(Continued)

FOREIGN PATENT DOCUMENTS

JP  10-3900 A    1/1998
JP  11-33745 A   2/1999
(Continued)

OTHER PUBLICATIONS

Notification of Reasons for Refusal dated Mar. 17, 2015 from the Japanese Patent Office in corresponding application No. 2012-168643.

*Primary Examiner* — Jeremiah Smith
(74) *Attorney, Agent, or Firm* — Sughrue Mion, PLLC

(57) ABSTRACT

A secondary battery has an electrode laminated body and a collector member. The laminated body is formed of a laminated electrode sheet. The collector member is bonded to a collector foil laminated portion of the electrode sheet not formed with an active material layer. The collector foil laminated portion and the collector member are bonded at overlapped portions by resistance welding using electrodes. When a pressure welding direction is a projection direction, an area ratio (Yd)/(Xd) is 1.2-4, in which Xd is a projection area of a surface of the electrode made contact with the collector foil laminated portion and Yd is a projection area of a surface of the electrode made contact with the collector member.

2 Claims, 11 Drawing Sheets

(51) Int. Cl.
*H01M 10/04* (2006.01)
*B23K 11/00* (2006.01)
*B23K 11/11* (2006.01)
*H01M 10/0525* (2010.01)

(52) U.S. Cl.
CPC ..... *H01M 10/0431* (2013.01); *B23K 2201/38* (2013.01); *H01M 10/0525* (2013.01)

(56) References Cited

U.S. PATENT DOCUMENTS

| | | |
|---|---|---|
| 2009/0104525 A1 | 4/2009 | Nakagawa et al. |
| 2010/0081050 A1 | 4/2010 | Taniguchi et al. |
| 2011/0076569 A1 | 3/2011 | Kimura et al. |
| 2011/0223454 A1* | 9/2011 | Urano ................. H01M 2/0473 429/94 |

FOREIGN PATENT DOCUMENTS

| | | |
|---|---|---|
| JP | 2001-160378 A | 6/2001 |
| JP | 2002-8708 A | 1/2002 |
| JP | 2002-260628 A | 9/2002 |
| JP | 2003-251468 A | 9/2003 |
| JP | 2006-310254 A | 11/2006 |
| JP | 2008-204637 A | 9/2008 |
| JP | 2009-32640 A | 2/2009 |
| JP | 2009-99488 A | 5/2009 |
| JP | 2010016043 A | 1/2010 |
| JP | 2010-86780 A | 4/2010 |
| JP | 2011-92995 A | 5/2011 |

* cited by examiner

FIG. 14

- CC (constant current) Charge (1/5C, 2 hours)
  ↓
- Pause for 10 min.
  ↓
- CC Discharge (1/5C, 3.0 (V))
  ↓
- Pause for 10 min.
  ↓
- CCCV (constant current – low voltage) Discharge (1/3C, 4.1(V), 0.02C cut)
  ↓
- Pause for 10 min.
  ↓
- CCCV Charge (1/3C, 3.0(V), 0.02 cut)
  ↓
- Pause for 10 min.
  ↓
- CC Charge (1/5C, 4.1 (V) cut)
  ↓
- Leave standing at 45°C for 24 hours
  ↓
- First voltage measurement (V1)
  ↓
- Leave standing at 25°C for 96 hours
  ↓
- Second voltage measurement (V2)

SECONDARY BATTERY AND METHOD FOR MANUFACTURING SECONDARY BATTERY

CROSS REFERENCE TO RELATED APPLICATIONS

This is a US national phase application based on the PCT International Patent Application No. PCT/JP2013/068764 filed on Jul. 9, 2013, and claiming the priority of Japanese Patent Application No. 2012-168643, filed on Jul. 30, 2012, the entire contents of which are herewith incorporated by reference.

TECHNICAL FIELD

The present invention relates to a secondary battery and a method for manufacturing a secondary battery and more particularly to a secondary battery in which an electrode laminated body and a collector terminal are bonded by welding, and a method for manufacturing the secondary battery.

BACKGROUND ART

A secondary battery includes an electrode laminated body contained in an outer case. The electrode laminated body is produced in such a way that positive and negative electrode sheets are wound in a flat shape or stacked in flat layers by interposing separators therebetween. Each of the electrode sheets is made of a sheet-like collector foil formed, on its both surfaces, with active material layers.

To connect the electrode laminated body and an external terminal, conventionally, a collector terminal is provided. Specifically, the collector terminal is placed to extend through the outer case to electrically connect the electrode laminated body located inside the outer case to the external terminal located outside the outer case. The electrode laminated body and the collector terminal are usually bonded to each other by resistance welding conducted by passing an electric current through their portions to be bonded together while bringing the portions in pressure contact with each other. Examples of such bonding technique are disclosed in Patent Documents 1 and 2.

In the technique of Patent Document 1, a collector member (a collector terminal) is connected to a substrate exposed portion (a collector foil) of an end portion of a flat wound electrode body (an electrode laminated body). To be concrete, the substrate exposed portion consisting of overlapping parts of the foil is divided into two in an overlapping direction, and a current carrying block is placed between the divided two parts. Further, collector members are put on both outermost surfaces of the substrate exposed portion on both sides of the current carrying block. Thus, the collector member and the substrate exposed portion are connected by resistance welding and the substrate exposed portion and the current carrying block are connected by resistance welding (two points in each case). The current carrying block used thereof is a block formed with a protrusion which will be bonded to the substrate exposed portion. This protrusion is to be melted during resistance welding.

In the technique of Patent Document 2, a substrate exposed portion of a wound electrode body is held or clamped from both surfaces by a collector and a collector receiving part (a pair of collector terminals) in a direction of flat overlapping parts of the exposed portion, and the overlapping parts are bonded to each other by resistance welding. At least one of the collector and the collector receiving part is formed with a protrusion which will be bonded to the substrate exposed portion. This protrusion is to be melted during resistance welding.

RELATED ART DOCUMENTS

Patent Documents

Patent Document 1: JP-A-2011-92995
Patent Document 2: JP-A-2009-32640

SUMMARY OF INVENTION

Problems to be Solved by the Invention

Patent Documents 1 and 2 are each configured to hold the substrate exposed portion between two collector terminals. This would cause a problem with an increase in the number of components necessary for connection between the electrode laminated body and the collector terminal and also a complicated production process.

In Patent Documents 1 and 2, furthermore, there is used the member formed with a protrusion in a portion which will be a bonded portion to the substrate exposed portion. During resistance welding, an electric current is concentrated on a tip of the protrusion, thereby melting the protrusion. However, this method may cause excessive heat generation in the tip of the protrusion on which the current is concentrated. During resistance welding, furthermore, the protrusion which will become a bonded portion is subjected to pressing force for pressure welding in addition to the current. Accordingly, a melt of the protrusion melted by excessive heat generation is likely to scatter, causing generation of spatters. If the generated spatters enter, as foreign matters, in the electrode laminated body, they cause a voltage failure in a secondary battery. Furthermore, when the melt of the protrusion scatters, contact resistance during resistance welding does not become stable. This would cause a problem that a bonded portion could not be formed well and thus sufficient bonding strength could not be stably obtained.

The present invention has been made to solve the above problems and has a purpose to provide a secondary battery with high productivity and with reduced failures in welding for bonding an electrode laminated body and a collector terminal, and a method for manufacturing the secondary battery.

Means of Solving the Problems

To achieve the above purpose, one aspect of the invention provides a secondary battery including: an electrode laminated body formed of laminated electrode sheets each including a collector foil partially formed with an active material layer; and a collector member bonded to a collector foil laminated portion formed of a part of the electrode sheet, the part being unformed with the active material layer, wherein a bonded portion of the collector foil laminated portion welded to the collector member has a shape protruding toward the collector member, and when a protruding direction of the collector foil laminated portion is a projection direction, an area ratio of a projected area of a weld mark on a surface of the collector foil laminated portion and a projected area of a weld mark on a surface of the collector member, the weld marks being generated during welding, falls within a range of 1.2 to 4 inclusive.

Another aspect of the invention provides a method for manufacturing a secondary battery including: an electrode laminated body formed of laminated electrode sheets each including a collector foil partially formed with an active material layer; and a collector member bonded to a collector foil laminated portion formed of a part of the electrode sheet, the part being unformed with the active material layer, wherein the method includes bonding the collector foil laminated portion to the collector member by resistance welding in which the collector foil laminated portion and the collector member are placed so that respective portions to be bonded overlap each other, the portions are clamped from both sides between resistance welding electrodes while the portions are being held in pressure contact, and an electric current is passed between the resistance welding electrodes, and wherein when the pressure contact direction is a projection direction, a projected area Xd of a contact surface of the resistance welding electrode for pressing a surface of the collector foil laminated portion to the collector foil laminated portion and a projected area Yd of a contact surface of the resistance welding electrode for pressing the surface of the collector member to the collector member, an area ratio Yd/Xd is set within a range of 1.2 to 4 inclusive.

In the above configuration, bonding by resistance welding between the collector foil laminated portion and the collector member is performed with resistance welding electrodes designed so that the area ratio Yd/Xd is 1.2 or more but 4 or less as mentioned above. Accordingly, the collector foil laminated portion placed in pressure contact with, or pressure contact to, the collector member engages or digs into the collector member and also stretches by deformation. In the stretched collector foil laminated portion, the material forming the collector foil from which oxide has been removed is exposed, contact resistance between the collector foil laminated portion and the collector member in the relevant area becomes lower. Thus, high bonding strength can be stably obtained without needing excessive energy. Since a configuration for bonding the collector foil laminated portion and the collector member is simple, good productivity is also achieved.

In the aforementioned method for manufacturing a secondary battery, preferably, the resistance welding electrode for pressing the surface of the collector foil laminated portion has a tip having a spherical surface, and the resistance welding electrode for pressing the surface of the collector member has a tip having a flat shape.

Effects of the Invention

According to the above configuration of the present invention, it is possible to provide a secondary battery with high productivity and with reduced failures in welding for bonding an electrode laminated body and a collector terminal, and a method for manufacturing the secondary battery.

BRIEF DESCRIPTION OF THE DRAWINGS

FIG. 14 is a flowchart illustrating the steps performed on batteries in each of the Example and Comparative example.

MODE FOR CARRYING OUT THE INVENTION

Figure 1:
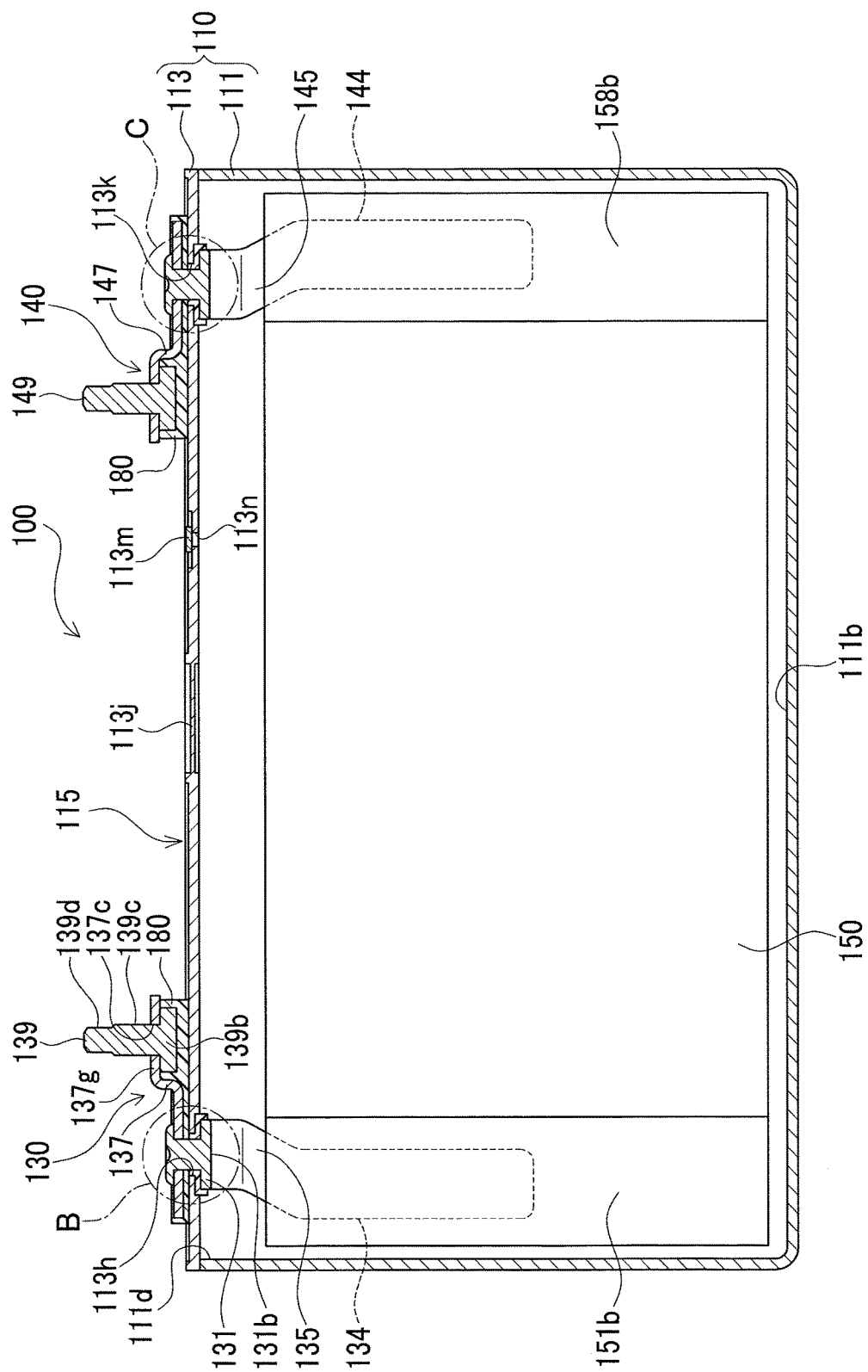
FIG. 1 is a cross sectional view showing a battery in an embodiment.
Figure 2:
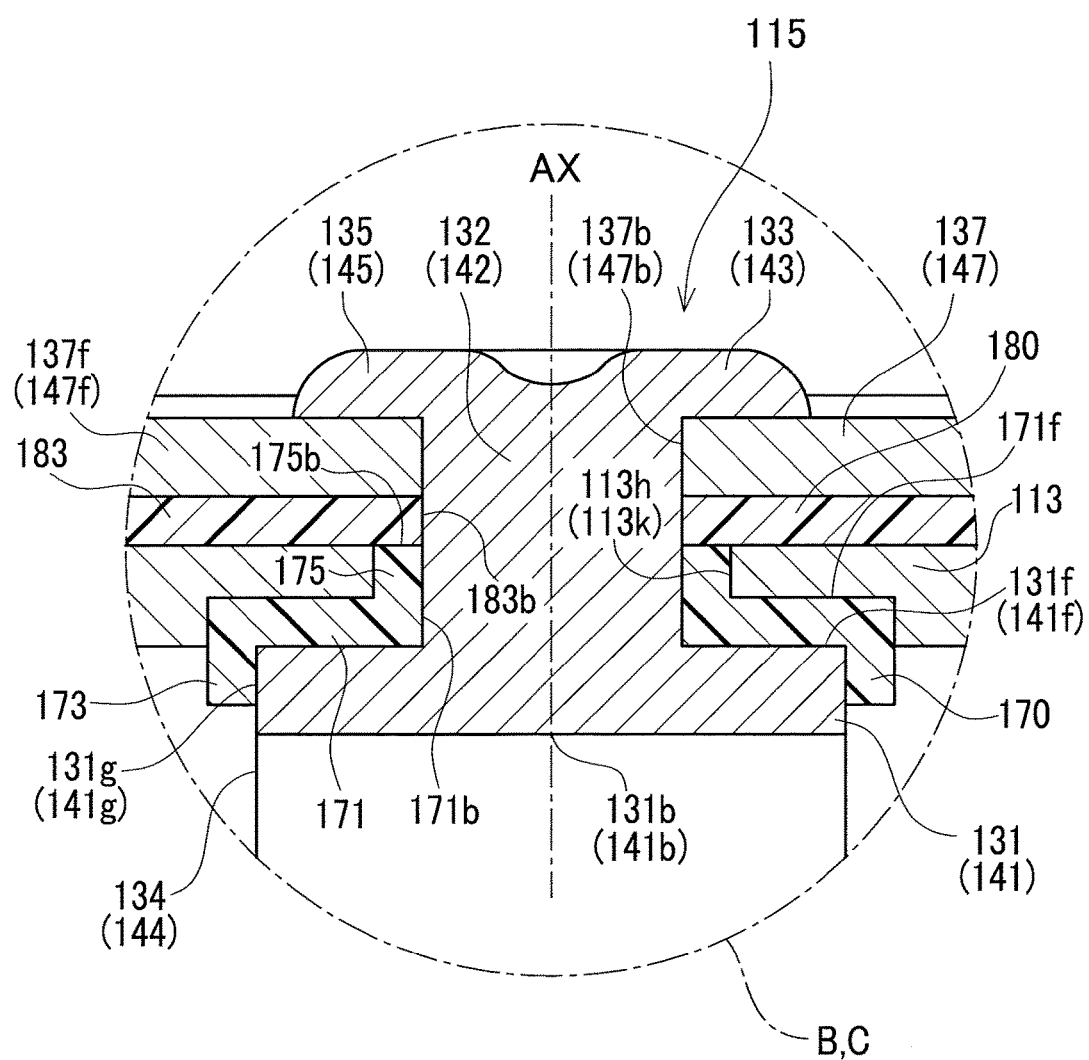
FIG. 2 is an enlarged view of a section B and a section C in FIG. 1.
Figure 3:
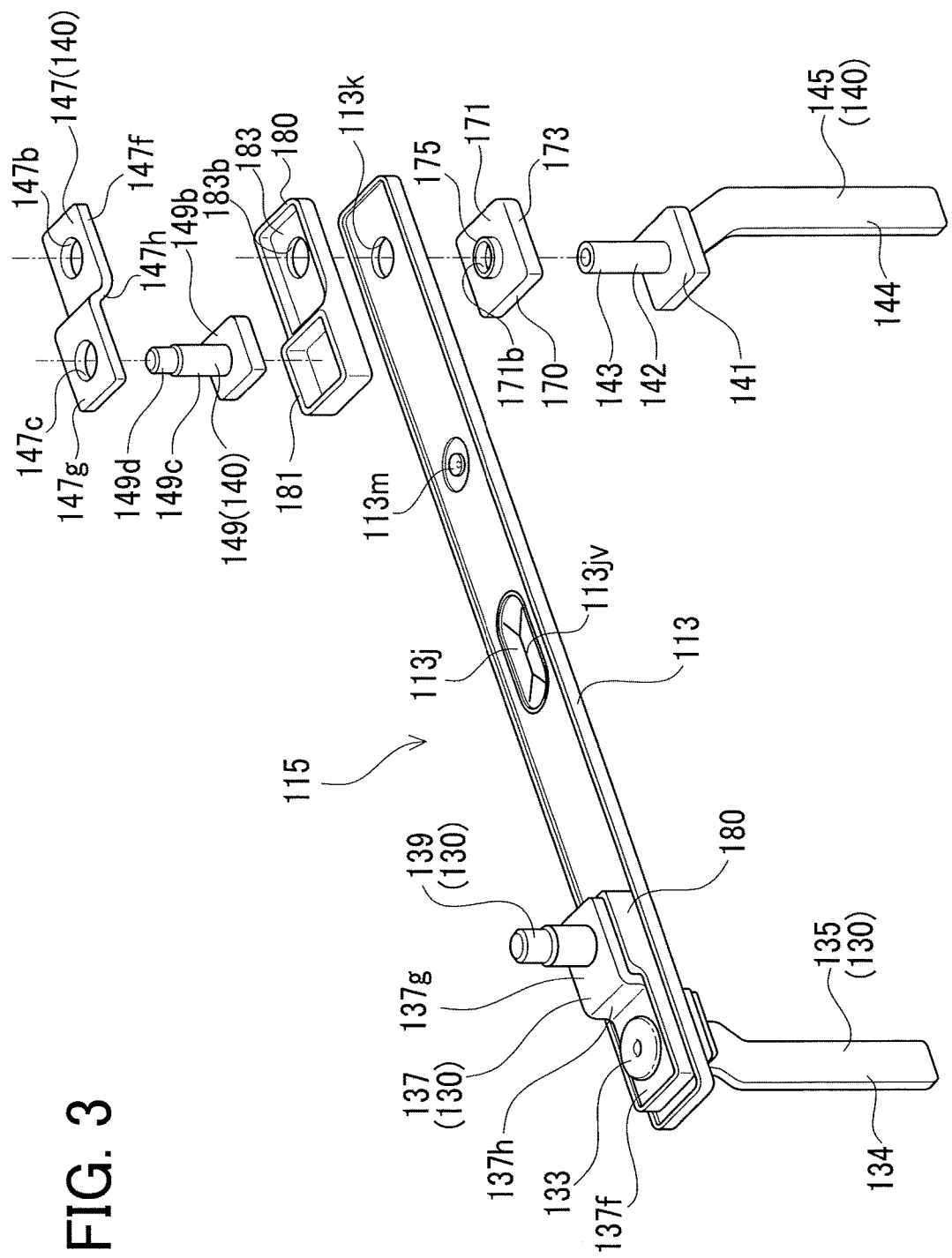
FIG. 3 is a view showing a terminal-attached lid member in the embodiment.

A detailed description of an embodiment of the present invention will now be given referring to the accompanying drawings. FIG. 1 is a cross sectional view of a battery 100 in the present embodiment. FIG. 2 is an enlarged view of a section B and a section C in FIG. 1. In FIG. 2, parts or components assigned doubly with parenthesized reference signs and unparenthesized reference signs represent those which are different between the section B and the section C. To be concrete, the unparenthesized reference signs denote the members of the section B and the parenthesized reference signs denote the members of the section C. FIG. 3 is a perspective view showing a part of a lid member 115 attached with terminals (a terminal-attached lid member) in an exploded manner in the present embodiment.

The battery 100 in this embodiment is, as shown in FIG. 1, a lithium ion secondary battery that includes a case body 111 of a rectangular box shape having an opening 111d, and an electrode body 150 enclosed in the case body 111. The battery 100 further includes a plate-shaped case lid 113 that closes the opening 111d of the case body 111. The case body 111 and the case lid 113 are integrally welded to each other, forming a battery case 110.

The case lid 113 has a rectangular plate-like shape and is formed with circular through holes 113h, 113k each penetrating through the case lid 113 in positions near both ends in a long-side direction (a lateral direction in FIG. 1). The case lid 113 is further provided, at its center in the long-side direction, with a safety valve 113j. This safety vale 113j is integrally formed with the case lid 113 to constitute a part of the case lid 113.

The safety valve 113j is formed to be thinner than other portions of the case lid 113 and is formed, on its upper surface, with a groove 113jv (see FIG. 3). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is poured into the battery case 110. In the completed battery 100, this liquid inlet 113n is sealed with a plug 113m.

The battery 100 further includes a positive terminal member 130 and a negative terminal member 140 (external terminal members) each of which is connected to the electrode body 150 inside the case body 111 and extends through corresponding through holes 113h and 113k of the case lid 113.

The positive terminal member 130 consists of a positive connecting member 135, a positive outer terminal member 137, and a positive fastening bolt 139 (see FIGS. 1 and 3). The connecting member 135 is connected to the electrode body 150 and extends out through the through hole 113h of the case lid 113. The outer terminal member 137 is located on the case lid 113, that is, outside the battery case 110, and is electrically connected to the connecting member 135 outside the battery case 110. The fastening bolt 139 is located on the case lid 113, that is, outside the battery case 110, and is electrically connected or connectable to the outer terminal member 137. Those connecting member 135, outer terminal member 137, and fastening bolt 139 are all made of aluminum or aluminium.

To be specific, the positive connecting member 135 includes a seat part 131, an insert-through part 132, an electrode body connecting part 134, and a deformed part 133 (see FIGS. 1 to 3). The seat part 131 has a rectangular plate-like shape and is located in the case body 111. The insert-through part 132 has a columnar shape protruding from an upper surface 131f of the seat part 131 and is inserted through the through hole 113h of the case lid 113. The deformed part 133 is a portion continuous to an upper end of the insert-through part 132 and is formed by caulking or riveting, that is, deformed to extend in diameter into a circular disk shape, and thus electrically connected to the positive outer terminal member 137. The electrode body connecting part 134 is shaped to extend from a lower surface 131b of the seat part 131 toward a bottom 111b of the case body 111 and is bonded to a positive mixture layer uncoated portion 151b of the electrode body 150. Thus, the positive connecting member 135 and the electrode body 150 are electrically and mechanically connected to each other.

The positive outer terminal member 137 has a nearly Z shape in side view. This outer terminal member 137 includes a fixed part 137f fixed by the deformed part 133, a connection part 137g connected to the fastening bolt 139, and a joint part 137h joining the fixed part 137f and the connection part 137g. The fixed part 137f is formed with a through hole 137b penetrating therethrough. In this through hole 137b, the insert-through part 132 of the positive connecting member 135 is inserted. The connection part 137g is also formed with a through hole 137c penetrating therethrough.

The positive fastening bolt 139 includes a rectangular plate-shaped head portion 139b and a columnar shaft portion 139c. The shaft portion 139c includes a distal end portion formed with screw threads 139d. The shaft portion 139c of the fastening bolt 139 is inserted in the through hole 137c of the positive outer terminal member 137.

The negative terminal member 140 consists of a negative connecting member 145, a negative outer terminal member 147, and a negative fastening bolt 149 (see FIGS. 1 and 3). The connecting member 145 is connected to the electrode body 150 and also extends out through the through hole 113k of the case lid 113. The outer terminal member 147 is located on the case lid 113, that is, outside the battery case 110, and is electrically connected to the connecting member 145 outside the battery case 110. The fastening bolt 149 is located on the case lid 113, that is, outside the battery case 110, and is electrically connected or connectable to the outer terminal member 147. Those connecting member 145, outer terminal member 147, and fastening bolt 149 are all made of copper.

To be concrete, the negative connecting member 145 includes a seat part 141, an insert-through part 142, an electrode body connecting part 144, and a deformed part 143 (see FIGS. 1 to 3). The seat part 141 has a rectangular plate-like shape and is located in the case body 111. The insert-through part 142 has a columnar shape protruding from an upper surface 141f of the seat part 141 and is inserted through the through hole 113k of the case lid 113. The deformed part 143 is a portion continuous to an upper end of the insert-through part 142 and is riveted, that is, deformed to extend in diameter into a circular disk shape, and thus electrically connected to the negative outer terminal member 147. The electrode body connecting part 144 is shaped to extend from a lower surface 141b of the seat part 141 toward the bottom 111b of the case body 111 and is bonded to a negative mixture layer uncoated portion 158b of the electrode body 150. Thus, the negative connecting member 145 and the electrode body 150 are electrically and mechanically connected to each other.

The negative outer terminal member 147 has a nearly Z shape in side view. This outer terminal member 147 includes a fixed part 147f fixed by the deformed part 143, a connection part 147g connected to the fastening bolt 149, and a joint part 147h joining the fixed part 147f and the connection part 147g. The fixed part 147f is formed with a through hole 147b penetrating therethrough. In this through hole 147b, the insert-through part 142 of the negative connecting member 145 is inserted. The connection part 147g is also formed with a through hole 147c penetrating therethrough.

The negative fastening bolt 149 includes a rectangular plate-shaped head portion 149b and a columnar shaft portion 149c. The shaft portion 149c includes a distal end portion formed with screw threads 149d. The shaft portion 149c of the fastening bolt 149 is inserted in the through hole 147c of the negative outer terminal member 147.

The battery 100 further includes a first insulating member 170 interposed between the positive terminal member 130 (i.e., the positive connecting member 135) and the case lid 113 to electrically insulate them from each other. Another first insulating member 170 is also interposed between the negative terminal member 140 (i.e., the negative connecting member 145) and the case lid 113.

To be concrete, each first insulating member 170 is made of electrically insulating resin and includes an insulating interposed part 171, an insulating side wall 173, and an insertion part 175 (see FIGS. 2 and 3). The interposed part 171 has a flat plate-like shape formed, at its center, with a circular through hole 171b in which the insert-through part 132 (insert-through part 142) of the positive terminal member 130 (negative terminal member 140) is inserted. This interposed part 171 is interposed between the upper surface 131f (upper surface 141f) of the seat part 131 (seat part 141) of the positive terminal member 130 (negative terminal member 140) and the case lid 113.

The insulating side wall 173 is a rectangular annular side wall located on a peripheral edge of the insulating interposed part 171. This side wall 173 surrounds an outer peripheral surface 131g (outer peripheral surface 141g) of the seat part 131 (seat part 141). The insertion part 175 has a cylindrical shape protruding from an upper surface 171f of the interposed part 171 and is inserted through the through hole 113h (through hole 113k) of the case lid 113. In a cylindrical hole of this insertion part 175, the insert-through part 132 of the positive terminal member 130 (insert-through part 142 of the negative terminal member 140) is inserted.

The battery 100 further includes a second insulating member 180 made of electrically insulating resin and placed on the case lid 113. This second insulating member 180 is interposed between the positive terminal member 130 (concretely, the positive outer terminal member 137 and the positive fastening bolt 139) and the case lid 113 to electrically insulate them from each other. Another second insulating member 180 is also interposed between the negative terminal member 140 (concretely, the negative outer terminal member 147 and the negative fastening bolt 149) and the case lid 113.

Specifically, each second insulating member 180 includes a head placing part 181 in which the head 139b of the positive fastening bolt 139 (the head 149b of the negative fastening bolt 149) is placed, and a fastening placing part 183 in which the fixed part 137f of the positive outer terminal member 137 (the fixed part 147f of the negative outer terminal member 147) is placed. The fastening placing part 183 is formed with a through hole 183b penetrating therethrough. In this through hole 183b, the insert-through part 132 of the positive terminal member 130 (the insert-through part 142 of the negative terminal member 140) is inserted.

In the present embodiment, the terminal-attached lid member 115 consists of the case lid 113, the electrode terminal members (the positive terminal member 130 and the negative terminal member 140), the first insulating members 170, 170, and the second insulating members 180, 180. Specifically, the positive outer terminal member 137, the second insulating member 180, the case lid 113, the and first insulating member 170 are fixed by clamping between the deformed part 133 and the seat part 131 of the positive terminal member 130. The negative outer terminal member 147, the other second insulating member 180, the case lid 113, and the other first insulating member 170 are fixed by clamping between the deformed part 143 and the seat part 141 of the negative terminal member 140. Thus, they are integrally assembled to form the terminal-attached lid member 115.

In the terminal-attached lid member 115, the insulating interposed part 171 of the first insulating member 170 is placed in an elastically compressed state in a direction of its own thickness (a vertical direction in FIG. 2) between the upper surface 131f (the upper surface 1410 of the seat part 131 (the seat part 141) of the positive terminal member 130 (the negative terminal member 140) and the case lid 113. Furthermore, the insertion part 175 of the first insulating member 170 is elastically compressed in a direction of its own axis (the vertical direction in FIG. 2) so that an end 175b of the insertion part 175 is held in close contact with the second insulating member 180. In this way, the first insulating members 170 seal the through holes 113h and 113k of the case lid 113.

Figure 4:
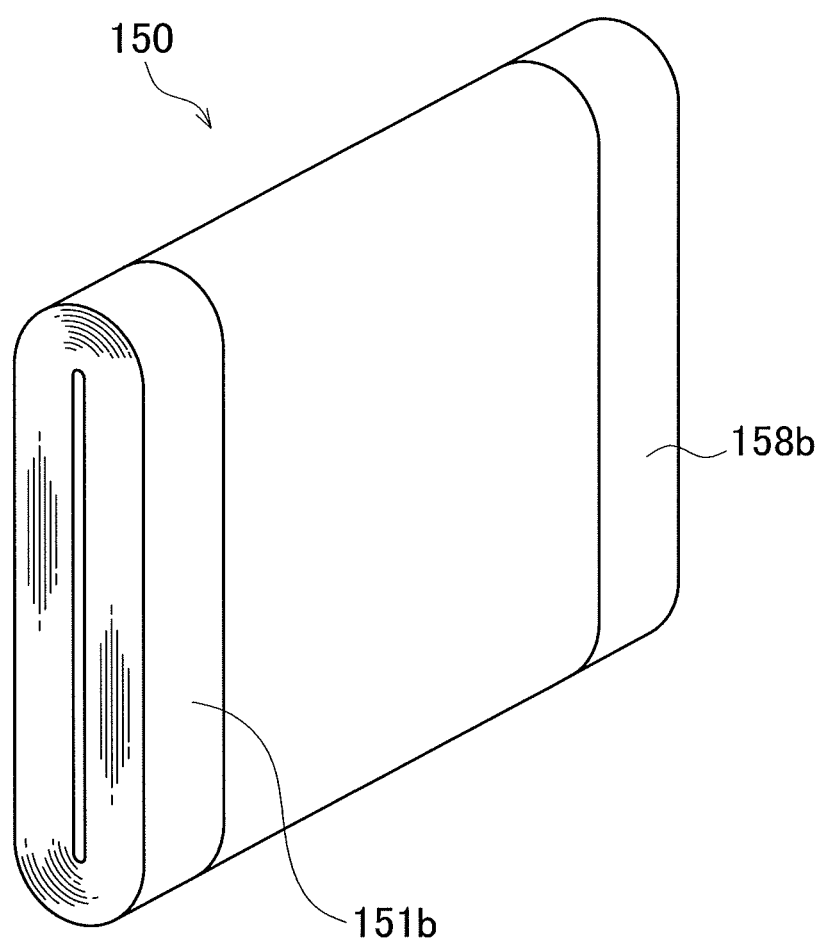
FIG. 4 is a perspective view of an electrode body in the embodiment.
Figure 5:
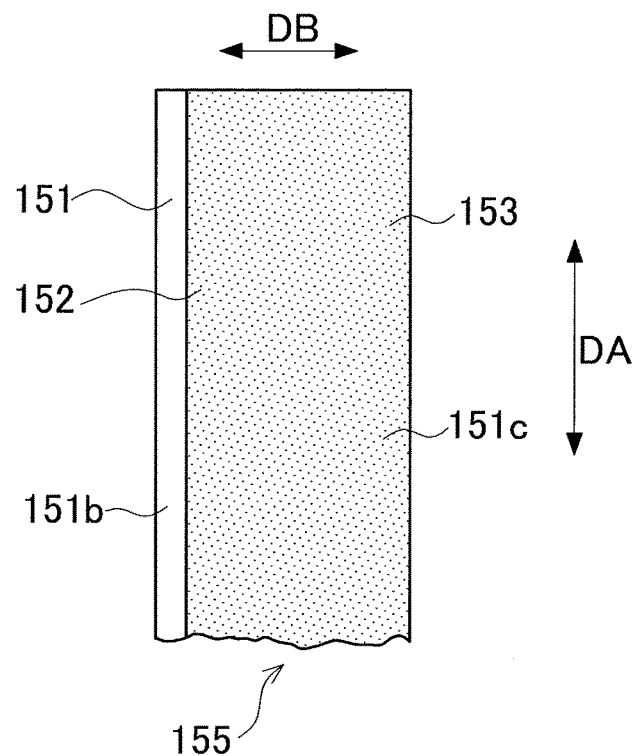
FIG. 5 is a view showing a positive electrode sheet of the electrode body.

The electrode body 150 is a wound electrode body of a flattened shape, in which a strip-shaped positive electrode sheet 155, a strip-shaped negative electrode sheet 156, and separators 157 are wound together into a flattened shape (see FIGS. 4 to 7). FIG. 4 shows the electrode body 150 before being connected to the positive terminal member 130 and the negative terminal member 140. The positive electrode sheet 155 includes a strip-shaped positive substrate 151 being made of aluminum (aluminium) current collector foil and extending in a longitudinal direction DA, and positive electrode mixture layers 152 each placed on part of each surface of the substrate 151 as shown in FIG. 5. The positive electrode mixture layer 152 contains positive active material 153, electrically conductive material made of acetylene black, and PVDF (polyvinylidene fluoride, binder).

Of the positive substrate 151, a portion coated with the positive electrode mixture layers 152 is referred to as a positive mixture layer coated portion 151c, while a portion not coated with the positive electrode mixture layer 152 is referred to as a positive mixture layer uncoated portion 151b. This uncoated portion 151b is located at one end (a left end in FIG. 5) of the positive substrate 151 (the positive electrode sheet 155) in a width direction DB (a lateral direction in FIG. 5) and extends along one long side of the substrate 151 (the positive electrode sheet 155) in a strip shape extending in the longitudinal direction DA of the substrate 151 (the positive electrode sheet 155), that is, in the vertical direction in FIG. 5.

Figure 6:
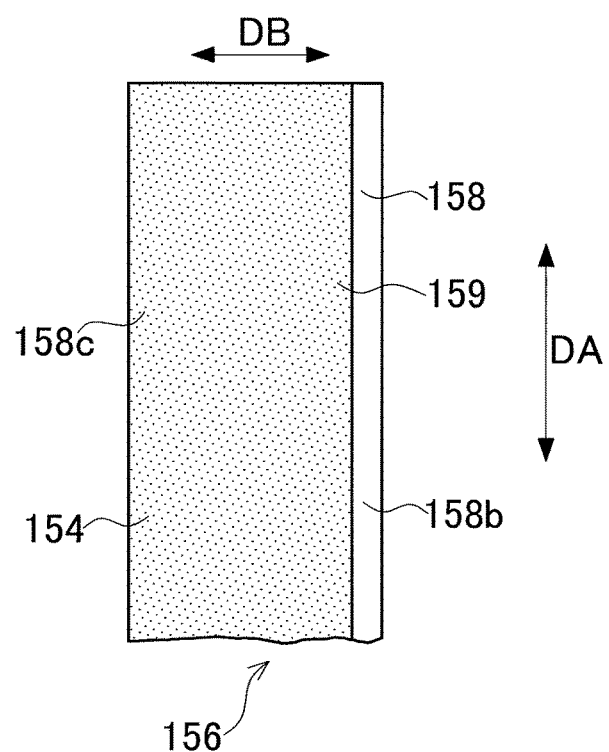
FIG. 6 is a view showing a negative electrode sheet of the electrode body.

The negative electrode sheet 156 includes a strip-shaped negative substrate 158 being formed of a current collector foil made of copper foil and extending in the longitudinal direction DA, and negative electrode mixture layers 159 each placed on part of each surface of the substrate 158 as shown in FIG. 6. The negative electrode mixture layer 159 contains negative active material 154, SBR (styrene-butadiene rubber, binder), and CMC (carboxymethyl cellulose, thickener).

Of the negative substrate 158, a portion coated with the negative electrode mixture layers 159 is referred to as a negative mixture layer coated portion 158c, while a portion uncoated with the negative electrode mixture layer 159 is referred to as a negative mixture layer uncoated portion 158b. This uncoated portion 158b is located at one end (a right end in FIG. 6) of the substrate 158 (the negative electrode sheet 156) in the width direction DB (a lateral direction in FIG. 6) and extends along one long side of the substrate 158 (the negative electrode sheet 156) in a strip shape extending in the longitudinal direction DA of the substrate 158 (the negative electrode sheet 156), that is, in the vertical direction in FIG. 6.

Figure 7:
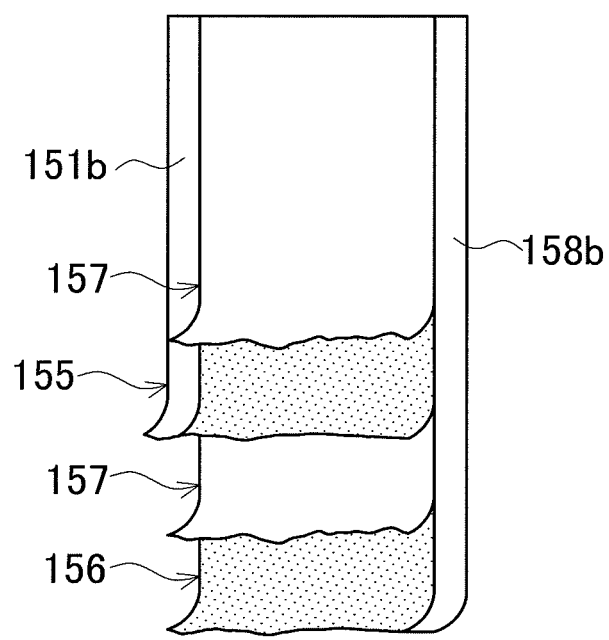
FIG. 7 is a view to explain an overlapping state of the positive electrode sheet, negative electrode sheet, and others in the electrode body.

The electrode body 150 in FIG. 4 is configured such that the positive electrode sheet 155, the negative electrode sheet 156, and the separators 157 are wound while overlapping one on another as shown in FIG. 7. Specifically, in an overlapping state in FIG. 7, the positive electrode sheet 155, the negative electrode sheet 156, and two separators 157 are overlapped one on another, and also the positive mixture layer uncoated portion 151b and the negative mixture layer uncoated portion 158b protrude in opposite directions. The width of each separator 157 is almost equal to the width of the positive mixture layer coated portion 151c and the negative mixture layer coated portion 158c. In FIG. 4 showing the wound state, therefore, the positive mixture layer uncoated portion 151b consists of a plurality of parts of the positive substrate 151 and the negative mixture layer uncoated portion 158b consists of a plurality of parts of the negative substrate 158.

In the battery 100 configured as above, a feature of the present invention is in bonded portions of the electrode body 150 and the negative connecting member 145, more specifically, bonded portions of the negative mixture layer uncoated portion 158b and the electrode body connecting part 144 of the negative connecting member 145. Therefore, the following explanation is given to a method for bonding the electrode body 150 and the negative connecting member 145 in the present embodiment.

Figure 8:
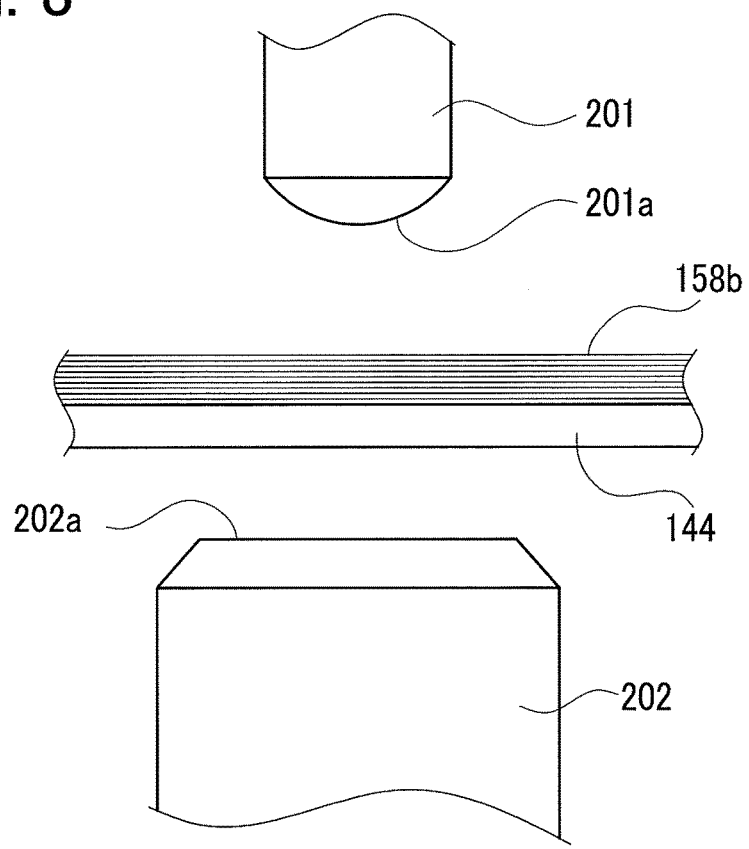
FIG. 8 is a view to explain an overlapping state of bonding portions of the electrode body and a negative connecting member in the battery in the embodiment.

FIG. 8 shows the negative mixture layer uncoated portion 158b and the electrode body connecting part 144 before the electrode body 150 and the negative connecting member 145 are bonded. In FIG. 8, these uncoated portion 158b and connecting part 144 are placed so that their bonding portions are overlapped each other.

FIG. 8 also shows an electrode 201 and an electrode 202. These electrodes 201 and 202 are resistance welding electrodes which will be used for resistance welding by therebetween holding or clamping the uncoated portion 158b and the connecting part 144 from both sides (from above and below in FIG. 8). As shown in FIG. 8, the electrode 201 used in the present embodiment has a tip 201a having a spherical surface. On the other hand, the electrode 201 used herein has a tip 202a having a flat frustum shape. In a state shown in FIG. 8, the electrodes 201 and 202 are not brought yet in contact with the uncoated portion 158b and the connecting part 144.

Figure 9:
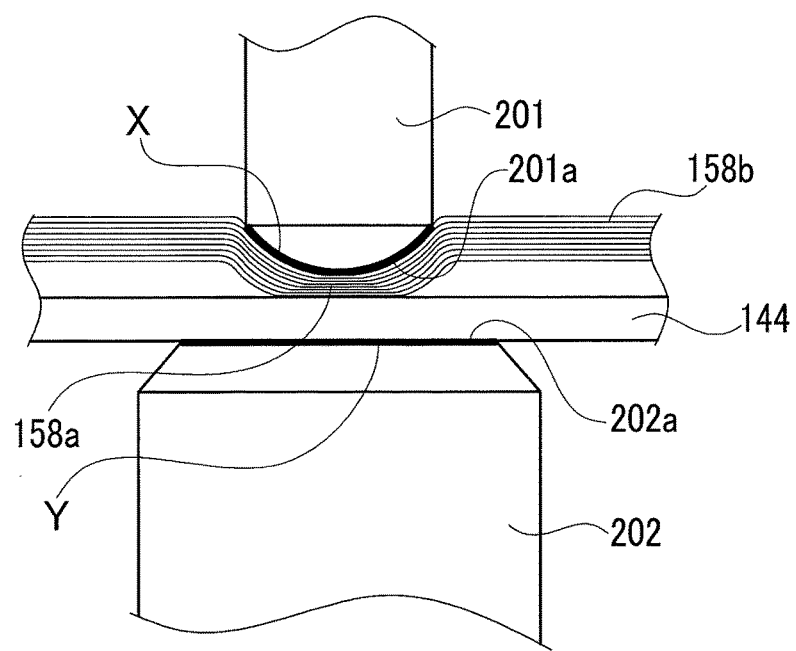
FIG. 9 is a view showing a state where the electrode body and the negative connecting member are held from both surfaces by electrodes in the battery in the embodiment.

FIG. 9 shows a state in which the negative mixture layer uncoated portion 158b and the electrode body connecting part 144 overlapped one on the other are held from both sides by the electrodes 201 and 202. In the state of FIG. 9, specifically, the electrode 201 presses against the uncoated portion 158b and the electrode 202 presses against the connecting part 144. As shown in FIG. 9, a part of the uncoated portion 158b subjected to the pressing force of the electrode 201 is deformed along the tip 201a, thereby forming a deformed portion 158a.

Since this deformed portion 158a is pressed into contact with the connecting part 144 by the pressing force of the electrode 201, actually, the deformed portion 158 is presumed to slightly dig into the connecting part 144. The deformed portion 158a is strongly pressed against the connecting part 144 by the electrode 201, thereby causing a remaining part of the uncoated portion 158b other than the deformed portion 158a to slightly move up and separate from the connecting part 144. Accordingly, the deformed portion 158a protrudes more than the other portion toward the connecting portion 144 in a pressure contact direction (an up-down direction in FIG. 9). When the tip 201a of the electrode 201 forms the deformed portion 158a, the tip 201a engages or digs into an outer surface (an upper surface in FIG. 9) of the uncoated portion 158b toward the connecting part 144.

In the present embodiment, while the uncoated portion 158b and the connecting part 144 are held in the state shown in FIG. 9, an electric current is passed between the electrodes 201 and 202 to resistance-weld the uncoated portion 158b and the connecting part 144. In this way, the uncoated portion 158b and the connecting part 144 are bonded to each other. This bonding may use resistance welding that partially melts the connecting part 144 and copper forming the uncoated portion 158b once or resistance pressure welding that does not obviously melt them.

Herein, a thick line X in FIG. 9 represents a contact surface of the electrode 201 with respect to the negative mixture layer uncoated portion 158b. Further, a projected area of the contact surface X in a projection direction corresponding to a pressure contact direction of the deformed portion 158a and the connecting part 144 is assumed as Xd. A thick line Y in FIG. 9 represents a contact surface of the electrode 202 with respect to the connecting part 144. Also, a projected area of the contact surface Y in a projection direction corresponding to the pressure contact direction is assumed as Yd. In the present embodiment, an area ratio Yd/Xd of the area Yd to the area Xd is set in a range of 1.2 to 4 inclusive.

Accordingly, assuming that the protruding direction of the deformed portion 158a is the projection direction, an area ratio between a projected area of a weld mark to be formed in the connecting part 144 with respect to a projected area of a weld mark to be formed in the bonded uncoated portion 158b also falls within a range of 1.2 to 4 inclusive. This is because the weld mark is supposed to be formed with a size equivalent to the tip area of an electrode having been placed in contact during resistance welding. The protruding direction of the deformed portion 158a caused to protrude by pressure contact is the same as the pressure contact direction.

In performing the above bonding, since the area ratio Yd/Xd between the area Xd of the electrode 201 and the area Yd of the electrode 202 is set in a range of 1.2 to 4 inclusive, the electrode body connecting part 144 and the negative mixture layer uncoated portion 158b are bonded well to each other. Specifically, they can be bonded with high bonding strength while suppressing bonding failure. This reason is estimated as below by the present inventors.

When the electrode body connecting part 144 and the negative mixture layer uncoated portion 158b placed one on the other are pressure contact by the electrodes 201 and 202, the deformed portion 158a is supposed to be subjected to extremely high surface pressure. This causes part of the copper foil forming the deformed portion 158a to dig into the connecting part 144 and also stretch while being deformed. As the surface of the copper foil of this stretched and deformed portion, a fresh surface with no oxide is exposed. Thus, the contact resistance in the contact portions of this fresh surface and the connecting part 144 is supposed to be lower than the contact resistance in the other contact portions of the uncoated portion 158b and the connecting part 144.

Since an electric current is passed between the electrodes 201 and 202 in the above state, a portion with low contact resistance allows many current paths to exist therein. This provides high conductivity in the current-passing portion, enabling good bonding. Further, the current-carrying resistance is low and charge energy for current carrying can be reduced. In fact, excessive heat generation and spatter generation are suppressed. It is thus unlikely to cause bonding failures due to generation of distortion and scattering of spattered substances.

The present embodiment exemplifies, as mentioned above, a combination of the tip 201a of the electrode 201 and the tip 202a of the electrode 202 in the form of the spherical surface and the frustum shape. The invention is not limited thereto and can also provide the effects even by using an electrode 201 having a flat-frustum-shaped tip 201a. However, it is estimated that the best effects of the invention are obtained when the spherical tip 201a of the electrode 201 and the flat tip 202a of the electrode 202 are used in combination. This combination is considered to most efficiently allow stretching of the deformed portion 158a and engaging of the deformed portion 158a into the connecting part 144.

[Verification of the Effects]

The present inventors made the following evaluation to verify the effects of the invention. A first explanation is made on a comparative test between bonding strength in Examples of the aforementioned bonding method in the present embodiment and bonding strength in Comparative examples of a bonding method different from the present embodiment.

In the test, firstly, a copper foil (a collector foil) of 10-mm thickness was wound in a flattened shape to produce a wound body. This wound body corresponds to the negative mixture layer uncoated portion 158b of the electrode body 150 (FIG. 4). Specifically, the wound body is made of the copper foil wound to overlap in sixty layers in the thickness direction (a right-left direction in FIG. 4). The total thickness of the wound body is 0.6 mm. This wound body was used in each of Examples and Comparative examples in the test.

Thereafter, the connecting part 144 of the negative connecting member 145 was placed on the wound body (corresponding to the negative mixture layer uncoated portion 158b) (FIG. 8) and they were clamped from both sides by the electrodes 201 and 202 (FIG. 9) and subjected to resistance welding. Each of Examples and Comparative examples was produced by use of different electrodes 201 and 202 as listed in the following Table 1. In Table 1, different conditions from those in the aforementioned embodiment are shown in italic type.

TABLE 1

| | Size of Tip of Electrode (mm) | | Area | | Recessed amount (mm) |
|---|---|---|---|---|---|
| | Electrode 201 | Electrode 202 | Ratio (Yd/Xd) | Protrusion | Average (n = 20) |
| Example 1 | ϕ2.8 | ϕ5 | 3.19 | Absence | 0.21 |
| Example 2 | ϕ2.8 | ϕ5.5 | 3.86 | Absence | 0.22 |
| Example 3 | ϕ2.8 | ϕ3.8 | 1.84 | Absence | 0.20 |
| Example 4 | ϕ4 | W5 × L8 | 3.19 | Absence | 0.21 |
| Comparative example 1 | ϕ7 | ϕ5 | 0.5 | Absence | 0.025 |
| Comparative example 2 | ϕ2.8 | ϕ2.8 | 1 | Absence | 0.05 |
| Comparative example 3 | ϕ2.8 | ϕ7 | 6.25 | Absence | 0.3 |
| Comparative example 4 | ϕ5 | ϕ5 | 1 | Presence | — |

As the electrodes 201 and 202, electrodes having a circular cross section were basically used. The diameters thereof are listed in Table 1. The electrode 202 used in Example 4 has a rectangular cross section, and its width (W) and length (L) are shown in Table 1. The area ratios (Yd/Xd) of the electrodes 201 and 202 used in Examples are all within the range of 1.2 to 4 inclusive as shown in Table 1.

On the other hand, as shown in italic type in Table 1, the area ratios (Yd/Xd) in Comparative examples are less 1.2 or over 4. Comparative example 4 used an electrode body connecting part 144 formed with a protrusion to be bonded to the wound body ("Presence" of Protrusion in Table 1). In this comparative example 4, the protrusion was melted during resistance welding to thereby bond the wound body and the connecting part 144.

The conditions of resistance welding performed using the electrodes shown in Table 1 were set as below.
Welding power unit: DDC welder NDWS-5500-4M (a resistance welding device by Nagsystem Co., Ltd.)
Set voltage: 10 (V)
Current-carrying time: 6 (msec)
Welding pressure: 3 (kN)
Electrode material: Tungsten The item "Recessed amount" in Table 1 represents an amount of digging of the electrode 201 into the wound body to clamp it during resistance welding. This recessed amount is shown by an average value of twenty samples of the same kind prepared in each of Examples and Comparative examples. In Comparative example 4, however, the resistance welding was performed by melting the protrusion and thus the recessed amount was not measured.

Herein, the recessed amounts in Examples range from 0.20 mm to 0.22 mm, which are almost equal. On the other hand, the recessed amounts in Comparative examples 1 and 2 with the area ratio (Yd/Xd) less than 1.2 were relatively small as compared to those in Examples. The recessed amount in Comparative example 3 with the area ratio (Yd/Xd) over 4 was relatively large as compared to those in Examples. In addition, the wound body in Comparative example 3 was observed as being broken in part of the copper foil of the pressed portion, even though the electrode 201 identical to those in Examples 1, 2, and 3 was used to press the wound body. It is conceived that this breakage is caused by excessive recessed amount.

Furthermore, in each of Examples and Comparative examples, the bonding strength between the wound body and the electrode body connecting part 144 was evaluated. To be concrete, twenty samples were subjected to a tensile test in each of Examples and Comparative examples and evaluated for an "average" of the bonding strength and "variation" corresponding to standard deviation as shown in Table 2 as below. In the tensile test, the wound body was fixed on a tensile tester and a distal end of the electrode body connecting part 144 was picked and lifted up, and a peak strength measured at that time was defined as bonding strength.

TABLE 2

| Results of Tensile test | | |
|---|---|---|
| | Bonding Strength (n = 20) | |
| | Average (N) | Variation σ |
| Example 1 | 292 | 37 |
| Example 2 | 280 | 38 |
| Example 3 | 231 | 49 |
| Example 4 | 250 | 37 |
| Comparative example 1 | 182 | 40 |
| Comparative example 2 | 233 | 72 |
| Comparative example 3 | 162 | 40 |
| Comparative example 4 | 265 | 72 |

Figure 10:
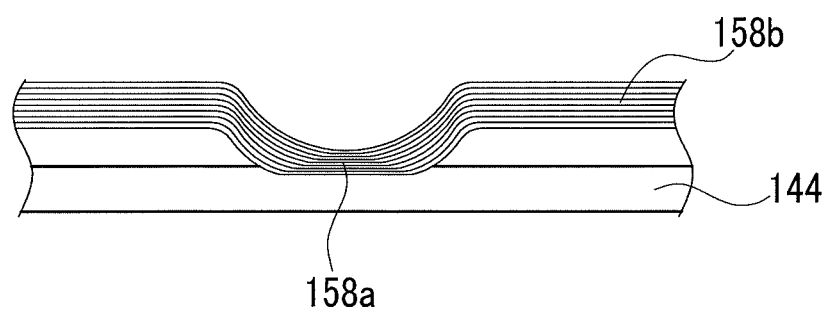
FIG. 10 is a cross sectional view of the bonded portions after bonding in Example 1.

As is seen from the results in Table 2, the bonding strengths in Examples have an average of 230N or more and variation of 50 or less. In observation of the cross section of the sample after bonded in Example 1, as schematically shown in FIG. 10, it was observed that the copper foil of a protruding end portion of the deformed portion 158a of the wound body pressed by the electrode 201 was bonded to, in digging state into, the electrode body connecting part 144. Accordingly, as mentioned above, it is conceivable that, of the copper foil of the wound body, the pressure contact portion before bonding was stretched, allowing the copper fresh surface with low contact resistance to be exposed. During resistance welding, many current paths exist in the copper surface portion exposed and pressure contact. Therefore, reliable bonding was achieved in that portion.

On the other hand, the bonding strengths in Comparative examples 1 and 3 are small in variation but low in average. The bonding strengths in Comparative examples 2 and 4 are high in average but large in variation. This reveals that stable and high bonding strengths could not be obtained by any method in Comparative examples. The reasons thereof are conceivable as below.

In Comparative examples 1 and 2, as described above in Table 1, the recessed amount is smaller than that in Examples. It is estimated from this result that the wound body insufficiently deformed by the electrode 201 results in a small exposed copper surface with low contact resistance. In other words, appropriate current paths as shown in Examples were absent, causing insufficient heat generation during resistance welding and poor bonding. In Comparative example 3, it is considered that partial breakage of the wound body due to excessive recessed amount as mentioned above caused bonding failures. In Comparative example 4, the protrusion was formed in a portion of the electrode body connecting part 144 to be bonded to the wound body, and this protrusion was melted during resistance welding. Accordingly, an electric current and a pressing force concentrate on that protrusion, causing the melt of the protrusion to scatter. It is therefore considered that the contact resistance did not become stable during resistance welding and hence stable bonding strength could not be obtained.

From above, it is found that when the areas of the electrode 201 pressing the wound body and the electrode 202 pressing the electrode body connecting part 144 were set with an area ratio Yd/Xd falling in a range of 1.2 to 4 inclusive, high bonding strength could be stably obtained.

Next, a battery in Example and a battery in Comparative example were produced and evaluated. The batteries in Example and Comparative example were made of the same materials and in the same configuration, excepting a bonding method for bonding the electrode body 150 and the negative connecting member 145. That is, the negative mixture layer uncoated portion 158b and the electrode body connecting part 144 were bonded by different bonding methods between Example and Comparative example. In Example, specifically, the uncoated portion 158b and the connecting part 144 were bonded by the method in Example 1 mentioned above. On the other hand, the battery in Comparative example was subjected to the bonding method in Comparative example 4 mentioned above.

Furthermore, bonding between the electrode body 150 and the positive connecting member 135, that is, bonding between the positive mixture layer uncoated portion 151b and the electrode body connecting part 134 were conducted by the same method in Example and Comparative example. Specifically, this bonding between the uncoated portion 151b and the connecting part 134 was performed by ultrasonic welding, not resistance welding.

Consequently, Example and Comparative example were evaluated as below about two points; the number of spatters generated during welding and voltage failures after initial charge and discharge.

The number of spatters generated during welding:
    Counted value of spatters (with a size of 50 to 200 μm) scattered out of the welded portion during welding.
Voltage failures after initial charge and discharge:
    Frequency of generation of disqualified products rejected as having a larger difference between two voltage values, than a reference value, the voltage values having been measured in two measurements after the completed battery 100 was initially charged and discharged.

FIG. 14 is a flowchart illustrating the initial charge, discharge and subsequent voltage measurements that were performed on twenty batteries in each of the Example and Comparative example according to the following steps. As shown in FIG. 14, the batteries, in the respective Example and Comparative example were first subjected to a constant current (CC) charge (1/5 C, 2 hours). Next, a 10 min. pause was observed. Following the pause, the batteries were subjected to a CC discharge (1/5 C, 3.0 V). Next, a 10 min. pause was observed. Following the second pause, the batteries were subjected to a constant current—low voltage (CCCV) discharge (1/3 C, 4.1V, 0.02 C cut). Next, a 10 min. pause was observed. After the third pause the batteries were subjected to a CCCV charge (1/3 C, 3.0V, 0.02 cut). Next, a 10 min. pause was observed. Following the fourth pause, the batteries were subjected to a CC charge (1/5, 4.1V cut). Next, the batteries were left standing at 45° C. for 24 hours. Then a first voltage measurement (V1) was taken. Following the first voltage measurement (V1), the batteries were left standing at 25° C. for 96 hours. Following the 96 hour standing, a second voltage measurement (V2) was taken.

From differences between voltage V1 and voltage V2 measured as above, an average and a standard deviation in twenty batteries of the same kind were determined. Consequently, if a difference(s) falling outside a range three times larger, i.e., upper or lower, than the standard deviation with reference to the average value, a relevant battery is considered as an disqualified product.

TABLE 3

| Results of Battery evaluation test | | |
|---|---|---|
| | The number of generated spatters | Voltage failure |
| Example | 0 | 0/20 products |
| Comparative example | 11 | 3/20 products |

Results of the test are shown in Table 3. As seen in Table 3, in Example, "the number of generated spatters" is zero and the number of disqualified products in the voltage test is zero of twenty products. This results from high conductivity in the current-carrying portion during resistance welding, which will be a bonded portion, as mentioned above. Specifically, it is considered that excessive heat generation during current passage is suppressed and thus no spatter is generated. It is conceived that no generation of spatters did not cause any voltage failure due to spatters in a battery.

In Comparative example, on the other hand, many spatters were generated due to scattering of the melt of the protrusion. Of the batteries in Comparative example, three disqualified products were generated in the voltage test, which are considered to result from entrance of the generated spatters into the electrode bodies 150. From those results, accordingly, the batteries in Example of the present embodiment can be said to have had less failures in welding for bonding the electrode body 150 and the negative connecting member 145.

Figure 11:
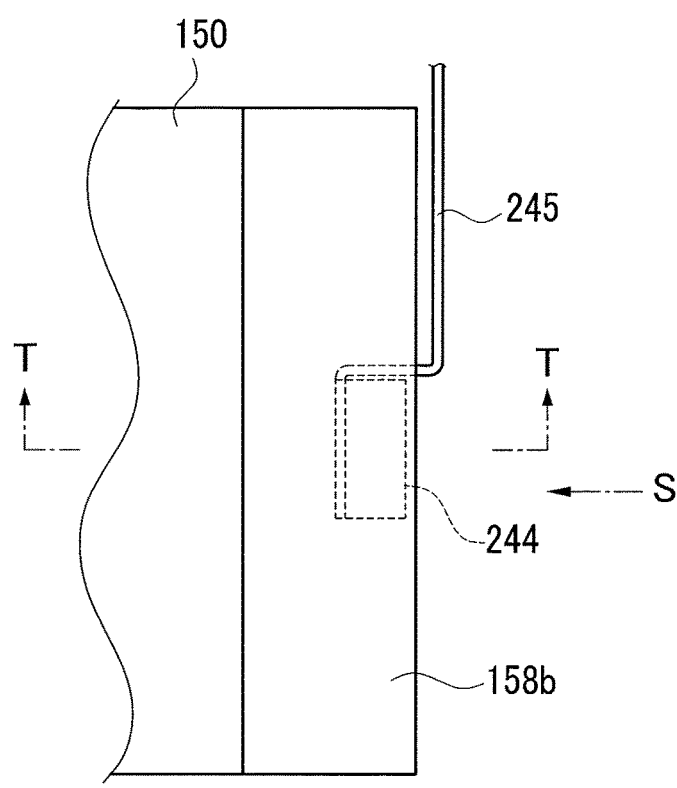
FIG. 11 is a view showing a negative mixture layer uncoated portion of an electrode body in a modified example.
Figure 12:
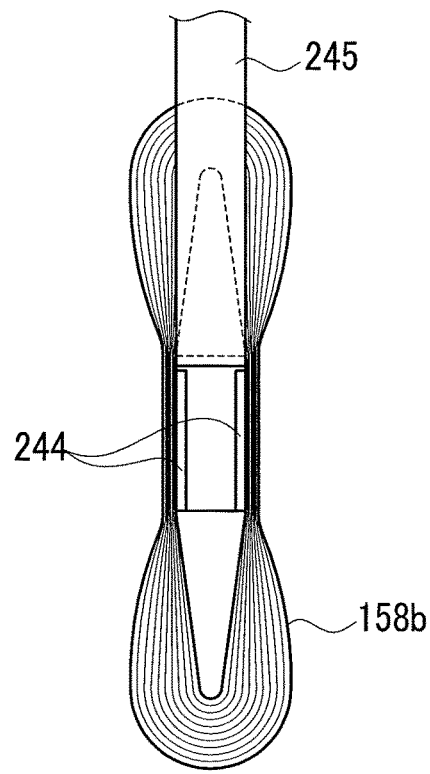
FIG. 12 is a view seen from an arrow S in FIG. 11.

[Modified Example]
A modified example of the aforementioned embodiment will be explained below. FIG. 11 is a view showing the negative mixture layer uncoated portion 158b and its vicinity in the electrode body 150. FIG. 12 is a view seen from an arrow S in FIG. 11. In this modified example, the uncoated portion 158b of the electrode body 150 is connected to a negative connecting member 245.

As shown in FIG. 12, the negative connecting member 245 includes two electrode body connecting parts 244. The two connecting parts 244 are held between two divided negative mixture layer uncoated portions 158b formed of overlapping parts of the negative substrate 158 in an overlapping direction (a right-left direction in FIG. 12). The two connecting parts 244 are respectively connected to inner sides of the two divided uncoated portions 158b. In the modified example, specifically, the uncoated portion 158b and the negative connecting member 245 are bonded at two places.

Figure 13:
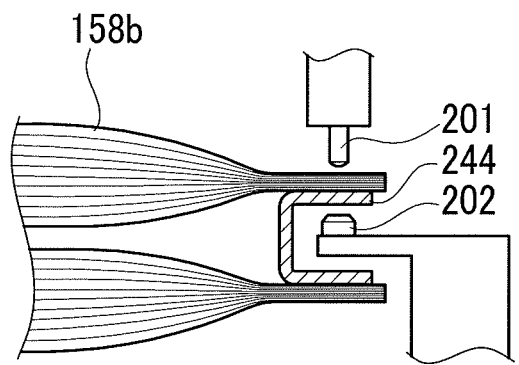
FIG. 13 is a cross sectional view (a cross sectional view taken along T-T in FIG. 11) to explain a bonding method in a modified example.

FIG. 13 is a cross sectional view taken along T in FIG. 11. FIG. 13 also shows the electrodes 201 and 202 for resistance welding the negative mixture layer uncoated portion 158b and the electrode body connecting part 244. Further, FIG. 13 corresponds to a case of bonding portions of the uncoated portion 158b and the connecting parts 244 to be bonded in an upper one of two places. Accordingly, after the state shown in FIG. 13, the bonding portions are clamped between the electrodes 201 and 202 and bonded by resistance welding. The bonding method itself is the same as that in the aforementioned embodiment. The same applies to portions of the uncoated portion 158b and the connecting part 244 to be bonded in a lower place. In this modified example, it is also possible to stably obtain high bonding strength while reducing the number of components.

According to the present embodiment explained in detail above, the negative mixture layer uncoated portion 158b of the electrode body 150 and the electrode body connecting part 144 of the negative connecting member 145 are clamped between the electrodes 201 and 202 and bonded to each other by resistance welding while being held in pressure contact with each other. Assuming that the (pressure contact) direction is the projection direction, the area ratio between the projected area Xd of the contact surface X of the electrode 201 with the uncoated portion 158b and the projected area Yb of the contact surface Y of the electrode 202 with the connecting part 144 falls within the range of 1.2 to 4 inclusive. Accordingly, sufficient bonding strength in the bonded portions can be achieved without needing excessive bonding energy. Specifically, the secondary battery with reduced welding failure and the manufacturing method thereof can be realized. Since the structure needed for bonding is simple, the productivity and others are also excellent.

The aforementioned embodiment is a mere example and does not limit the invention. Thus, the present invention may be embodied in other specific forms without departing from the essential characteristics thereof. For instance, the above embodiment shows the configuration that the invention is applied to only bonding for a negative electrode but not to bonding for a positive electrode. However, this is not required. The invention may be applied to the bonding for a positive electrode or both of positive and negative electrodes.

REFERENCE SIGNS LIST

100 Battery
130, 140 Positive terminal member and Negative terminal member
134, 144 Electrode body connecting part
150 Electrode body (Electrode laminated body)
151, 158 Positive substrate and Negative substrate (Collector foil)
151b, 158b Mixture layer uncoated portion (Collector foil laminated part)
152, 159 Positive mixture layer and Negative mixture layer (Active material layer)
202, 202 Electrode
201a, 202a Tip

The invention claimed is:

1. A method for manufacturing a secondary battery including: an electrode laminated body formed of laminated electrode sheets each including a collector foil partially formed with an active material layer; and a collector member bonded to a collector foil laminated portion formed of a part of the electrode sheet, the part being unformed with the active material layer,
   wherein the method includes bonding the collector foil laminated portion to the collector member by resistance welding in which the collector foil laminated portion and the collector member are placed so that respective portions to be bonded overlap each other, the portions are clamped from both sides between resistance welding electrodes while the portions are being held in pressure contact, and an electric current is passed between the resistance welding electrodes, and
   wherein when the pressure contact direction is a projection direction, a projected area Xd of a contact surface of the resistance welding electrode, having a rounded tip, for pressing a surface of the collector foil laminated portion to the collector foil laminated portion and a projected area Yd of a contact surface of the resistance welding electrode for pressing the surface of the collector member to the collector member, an area ratio Yd/Xd is set within a range of 1.2 to 4 inclusive.

2. The method for manufacturing a secondary battery according to claim 1, wherein
   the rounded tip of the resistance welding electrode for pressing the surface of the collector foil laminated portion has a spherical surface, and
   the resistance welding electrode for pressing the surface of the collector member has a tip having a flat shape.

* * * * *